United States Patent
Dawley et al.

(10) Patent No.: US 9,079,807 B2
(45) Date of Patent: Jul. 14, 2015

(54) END-BURNING PROPELLANT GRAIN WITH AREA-ENHANCED BURNING SURFACE

(75) Inventors: Scott K. Dawley, Culpeper, VA (US); Mark Peyser Friedlander, III, Centreville, VA (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 0 days.

(21) Appl. No.: 13/703,787

(22) PCT Filed: Jun. 8, 2011

(86) PCT No.: PCT/US2011/039653
§ 371 (c)(1),
(2), (4) Date: Feb. 21, 2013

(87) PCT Pub. No.: WO2012/047322
PCT Pub. Date: Apr. 12, 2012

(65) Prior Publication Data
US 2013/0145949 A1    Jun. 13, 2013

Related U.S. Application Data

(60) Provisional application No. 61/354,856, filed on Jun. 15, 2010.

(51) Int. Cl.
| C06B 45/00 | (2006.01) |
| C06B 45/06 | (2006.01) |
| C06B 45/10 | (2006.01) |
| F02K 9/12 | (2006.01) |
| F02K 9/22 | (2006.01) |

(52) U.S. Cl.
CPC .............. *C06B 45/06* (2013.01); *C06B 45/00* (2013.01); *C06B 45/10* (2013.01); *F02K 9/12* (2013.01); *F02K 9/22* (2013.01); *F05D 2250/232* (2013.01)

(58) Field of Classification Search
CPC ........ C06B 45/00; C06B 45/06; C06B 45/10; F02K 9/12; F02K 9/22
USPC ......... 102/283, 285, 286, 287, 288, 289, 291, 102/292
See application file for complete search history.

(56) References Cited

U.S. PATENT DOCUMENTS

| 1,880,579 A | 10/1932 | Tiling |
| 3,105,350 A | 10/1963 | Eichenberger |
| 3,138,499 A | 6/1964 | Camp et al. |

(Continued)

FOREIGN PATENT DOCUMENTS

| DE | 20 34 104 A1 | 1/1972 |
| FR | 1 357 255 A | 4/1964 |
| WO | 87/05362 A1 | 9/1987 |

OTHER PUBLICATIONS

Written Opinion of the International Searching Authority for PCT/US2011/39653; Dec. 15, 2012.*

(Continued)

*Primary Examiner* — James S Bergin
(74) *Attorney, Agent, or Firm* — Joel G Landau

(57) ABSTRACT

An end-burning grain of a solid rocket motor or other gas-generating device is supplemented with one or more sticks of high-burn-rate propellant embedded in a matrix of a relatively low-burn-rate propellant. The sticks increase the burning surface area as the grain burns by forming conical indentations in the surface.

17 Claims, 2 Drawing Sheets

(56) References Cited

U.S. PATENT DOCUMENTS

| | | | |
|---|---|---|---|
| 3,292,545 A | 12/1966 | Matsubara | |
| 3,529,551 A | 9/1970 | Barbero et al. | |
| 4,729,317 A * | 3/1988 | Burdette et al. | 102/287 |
| 5,524,544 A * | 6/1996 | O'Meara et al. | 102/287 |
| 5,682,009 A * | 10/1997 | O'Meara et al. | 102/290 |
| 5,714,711 A * | 2/1998 | Schumacher et al. | 102/291 |
| 6,125,763 A * | 10/2000 | Kline et al. | 102/381 |
| 8,015,920 B1 * | 9/2011 | Wilkinson et al. | 102/287 |
| 2002/0053377 A1 | 5/2002 | Martin et al. | |
| 2004/0050283 A1 | 3/2004 | Daoud | |

OTHER PUBLICATIONS

International Search Report from PCT/US2011/039653, dated Mar. 27, 2012 (2 pages).

Sikder et al., "A review of advanced high performance, insensitive and thermally stable energetic materials emerging for military and space applications," Journal of Hazardous Materials, Aug. 2004, vol. 112(1-2), pp. 1-15, DOI: 10.1016/J.JHAZMAT.2004.04.003.

EP Application No. 11 83 1071, Supplementary European Search Report, Mailed Jan. 14, 2014, 6 pages.

* cited by examiner

END-BURNING PROPELLANT GRAIN WITH AREA-ENHANCED BURNING SURFACE

CROSS-REFERENCE TO RELATED APPLICATION

This application is the United States National Stage entry of International Application No. PCT/US2011/039653, filed Jun. 8, 2011, which claims the benefit of United States Provisional Patent Application No. 61/354,856, filed Jun. 15, 2010, the contents of each are incorporated herein by reference.

BACKGROUND OF THE INVENTION

End-burning grains are used in solid propellant rocket motors and pyrotechnic gas generators that require stable and prolonged generation of combustion gases. In addition to these qualities, end-burning grains reduce the chances of spalling of the propellant and of unintentional ignition upon impact from bullets or fragments. An end-burning grain also allows a motor to accommodate a high volume of propellant, and when desired, the propellant can be loaded in a cartridge for easy placement in the motor case. Examples of end-burning rocket motors are the original Stinger (a surface-to-air missile developed by the United States Army), the ARCAS (All-Purpose Rocket for Collecting Atmospheric Soundings, first developed by Atlantic Research Corporation), and the Standard Missile Sustainer motors (also developed by Atlantic Research Corporation).

In an end-burning motor, the length of the propellant grain establishes the duration of the thrust, while the magnitude of the thrust depends on the mass burning rate which is determined by the choice of propellant as well as the area of the burning surface. The mass burning rates of solid propellants are limited, however, and while propellant compositions can be modified to achieve higher burn rates, these modifications tend to produce smoke, toxic gases, or both. The smoke emitted from shoulder-launched rockets such as the Stinger obscures the user's vision and risks eye damage, and smoke emitted from tactical rockets launched from aircraft or ground vehicles impairs the visibility of the pilot or driver. Smoke also leaves a visible trail that can indicate the source of the launched rocket.

To address these problems, reduced-smoke and minimum-smoke propellants have been developed. Unfortunately, the ballistic properties of such propellants, particularly the minimum-smoke propellants, are generally undesirable because their burning rates are temperature-dependent, as opposed to "plateau" or "mesa" burning rates, i.e., burning rates that are insensitive to temperature over a wide range of operating pressures. Propellants with "plateau" or "mesa" burning rates are capable of providing substantially constant thrust regardless of firing conditions and operating temperature. Burning rate modifiers that are specifically designed to achieve "plateau" or "mesa" burning rate behavior are often included in minimum-smoke propellants, and the modifiers of choice for this purpose are lead salts and lead-containing compounds, as described in U.S. Pat. No. 3,138,499 (A. T. Camp et al., inventors, issue date Jun. 23, 1964). Lead salts and related compounds present problems, however. They are toxic, they complicate the propellant manufacturing process, they produce exhaust products that are hazardous to personnel, particularly during training exercises involving the use of the rockets, and they are harmful to the environment in which the training exercises are conducted. For these reasons, training in the use of rockets with minimum-smoke propellants must include expensive range remediation from the toxic by-products.

Enlargement of the area of the burning surface to increase thrust can be achieved by increasing the motor diameter, but this too has its limitations, since there are practical limitations on how large the motor diameter can be.

SUMMARY OF THE INVENTION

The present invention resides in an end-burning rocket motor with a propellant grain that is capable of serving as a minimum-smoke propellant and also has a modified exponent, i.e., a lowered sensitivity to pressure changes at high pressures. The propellant grain of this invention produces localized concave regions in the burning surface during the course of burning, thereby increasing the burning surface area relative to that formed during unassisted or uniform burning across the burning surface. The grain of the present invention maintains and expands the increased area as the propellant burns and does so without the need for additives, especially lead salts and lead-containing compounds, that increase the amount of toxic by-products produced by the motor.

The increased surface area is achieved by the use of a matrix propellant that has one or more faster-burning sticks, i.e., rods of small cross section relative to the grain as a whole, embedded in the matrix propellant, the sticks being of a propellant with a burn rate that is higher than the burn rate of the matrix propellant. The stick(s) extend from the starting burn surface into the bulk of the matrix propellant, and in many cases they extend the full length of the matrix propellant. Upon ignition of the grain from the ignition (aft) end, the relatively high heat generated by the faster-burning stick(s) causes the regions of the matrix propellant that are closest to each stick to burn faster than regions that are further away. The matrix propellant thus burns at rates approximately proportional to the radial distance from each stick, producing localized concave regions that are at least approximately shaped as right-circular inverse cones. In certain embodiments of the invention, the propellant grain is shaped to include small cone-shaped depressions or other surface features in the burn surface prior to ignition. These surface features help to initiate the growth of the concave regions during burning or to otherwise control the initial rocket motor performance. In general, however, the ballistics of the motor in terms of burn rate behavior are controlled by the high-burning-rate stick(s) while the matrix propellant determines the rocket motor performance in terms of the operating pressure and combustion characteristics of the propellant. The use of the stick(s) allows a wide latitude in matrix materials, and also allows metallic additives such as lead and smoke-generating materials such as ammonium perchlorate to be eliminated without significant loss of performance and without significant increase in smoke generation.

DETAILED DESCRIPTION OF THE INVENTION AND PREFERRED EMBODIMENTS

Figure 1:
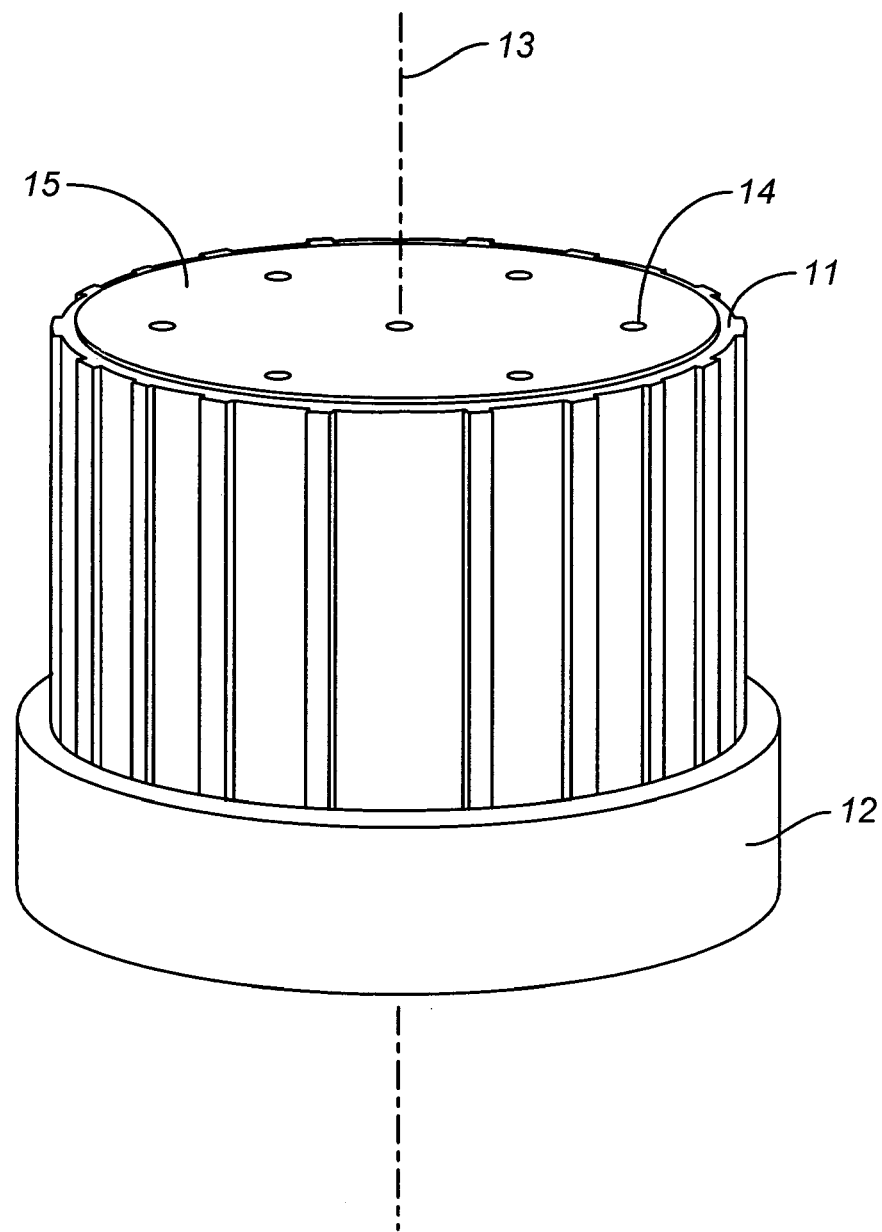
FIG. 1 is a perspective cross section view of a propellant grain within the scope of the present invention.

The material of which the sticks are formed, hereinafter referred to as "ballistic control propellant," and the matrix propellant are solid rocket propellants, including many of the propellants known in the art. The ballistic control propellant and the matrix propellant are distinguishable from each other by their burn rates. Although the specific materials used in any single embodiment of the invention can vary widely, best results will in most cases be obtained when the burn rate of the ballistic control propellant is from about 1.3 times to about ten times the burn rate of the matrix propellant, or from about 1.5 times to about five times, or from about 1.5 times to about three times. Expressed as the burning rates themselves, ballistic control propellants can have, for example, burning rates within the range of about 0.75 in/sec (1.9 cm/sec) to about 5.0 in/sec (12.7 cm/sec) at 2,000 psi, or from about 0.85 in/sec (2.2 cm/sec) to about 3.0 in/sec (7.6 cm/sec) at 2,000 psi, and matrix propellants can have burning rates within the range of about 0.25 in/sec (0.64 cm/sec) to about 2.0 in/sec (5.1 cm/sec) at 2,000 psi, or from about 0.4 in/sec (1.0 cm/sec) to about 1.0 in/sec (2.5 cm/sec) at 2,000 psi, with the difference between the burning rates of the two propellants being within the range of about 0.25 in/sec (0.64 cm/sec) to about 2.0 in/sec (5.1 cm/sec), and preferably from about 0.4 in/sec (1.0 cm/sec) to about 1.0 in/sec (2.5 cm/sec). In a presently contemplated example, the ballistic control propellant has a burn rate of 1.0 in/sec (2.5 cm/sec) at 2,000 psi, and the matrix propellant has a burn rate of 0.55 in/sec (1.4 cm/sec) at 2,000 psi.

The ballistic control propellant can be either a homogeneous propellant or a composite propellant, and the same is true for the matrix propellant. Composite propellants can include fuels, oxidizers, and binders, particularly energetic oxidizers and binders. Indeed, the term "propellant" as used herein is intended to include energetic polymers, energetic oxidizers, and binders, and propellant compositions can further include additional components such as stabilizers and modifiers. The ballistic control propellant can include nitrocellulose, for example, in combination with an energetic plasticizer such as, for example, cyclotetramethylene tetranitramine (HMX), cyclotrimethylene trinitramine (RDX), butyl nitratoethyl nitramine (BuNENA), butanetriol trinitrate (BTTN), bis-dinitropropylacetal/formal (BDNPA/F), or methyl/ethyl nitratoethyl nitramine (Me/Et NENA), and further in combination with a high-nitrogen burning rate modifier such as, for example, triaminoguanidinium azotetrazolate (TAGzT), guanidinium azotetrazolate (GUzT), 1,1-diamino-2,2-nitroethene (FOX-7), 3,3'-diamino-4,4'-azoxyfurazan (DAAF), or 2,6-diamino-3,5-dinitropyrazine-1-oxide (LLM-105). The ballistic control propellant preferably has a burn rate that is greater than 1 inch per second at 3,000 psi, and is thermally insensitive. For the matrix propellant, examples of energetic components of particular interest are cyclotetramethylene tetranitramine (HMX), cyclotrimethylene trinitramine (RDX), bis-nitrofurazanyl furoxan (BNFF), 3,3'-dinitro-4,4'-furazanyl oxamide (DNFOA), methylene-bis-aminonitrofurazan (MBANF), 2,4,6,8,10,12-hexanitro-2,4,6,8,10,12-hexaazaisowurtzitane (CL-20), and ammonium 2-oxy-5-nitrotetrazolate (AONT). In the ballistic control propellant, and in certain cases, both the ballistic control propellant and the matrix propellant, preferred formulations have a low pressure sensitivity at high pressures. This sensitivity is expressed in the art as the exponent, which is a measure of the increase in burning rate of a propellant which occurs as the chamber pressure is increased. Preferred formulations are those in which the exponent exhibits "plateau" or "mesa" burning rate behavior at operating pressures, and in many cases those in which the exponent is less than 0.5 at 1,000 psi.

The thicknesses of the ballistic control propellant sticks, the number of the sticks, their spacing from each other and from the walls of the motor casing, and their placement (i.e., relative positions) within the matrix propellant can all vary and are not critical to the invention. In many, but not all, embodiments, the number of sticks is one to thirty; in certain of these, the number is three to twenty; and in certain of these, the number is five to twenty. The diameter of a stick in preferred embodiments is within the range of about 0.1 inch (0.25 cm) to about 1.0 inch (2.54 cm), and in many cases from about 0.1 inch (0.25 cm) to about 2.0 inch (0.51 cm). Expressed in terms of the ratio of the total cross section area of the sticks to the total cross section area of the propellant grain, including both the sticks and the matrix propellant, this ratio can be from about $1 \times 10^{-4}$ to about $3 \times 10^{-3}$, and will often be from about $3 \times 10^{-4}$ to about $1 \times 10^{-3}$. In one presently contemplated embodiment, the propellant grain is approximately 5.5 inches (14 cm) in diameter and 10.5 inches (26.7 cm) in length with seven sticks of embedded ballistic control propellant, each approximately 0.14 inch (0.36 cm) in diameter and 10.5 inches (26.7 cm) in length, one stick at the center of the grain and the remaining six distributed in a circle around the center, approximately two-thirds to three-fourths of the distance from the center to the casing wall.

The sticks of ballistic control propellant can be aligned parallel to the longitudinal axis of the motor casing or to the casing wall, and for motors that are right circular cylinders with a central axis, the sticks will often be parallel to the central axis. When a single stick is used, the stick is conveniently positioned along (coincident with) the central axis. When two or more sticks are used, the sticks can be arranged symmetrically around the axis, either with a single stick along the axis, or all sticks equidistant from the axis. An alternative to alignment of the sticks parallel to the axis is an orientation in which the sticks are angled relative to the axis but have a component parallel to the axis. This includes sticks that are angled outward from the axis in either direction relative to the burn direction, as well as sticks that are spiral in shape.

The propellant grain, including the sticks of ballistic control propellant and the matrix propellant, can either be formed in the motor casing directly, or pre-formed as a single coherent solid mass or cartridge and inserted in the casing, all such methods being known in the rocketry art. The sticks will in many cases be formed first and positioned according to their final position in the grain, and the matrix propellant will then be formed or placed around the sticks. When formed in the motor casing or in a cartridge casing, the matrix propellant can be cast from a liquid solution or slurry containing a heat-curable binder and heat cured in place. Other methods of forming a propellant grain in an end-burning motor will be readily apparent to those of skill in the art. The grain can be securely bonded to the casing in which it is cast, without gaps, to avoid localized gas pockets or gas flow in directions other than the intended direction, i.e., the aft direction from the end surface. Bonding at the casing wall is likewise accomplished by conventional means, such as for example the use of the same binder that binds the grain into a coherent mass.

The matrix propellant can be devoid of metallic fuels, examples of which are aluminum and boron, and also devoid of halogen-containing additives, including chlorine-containing oxidizers, of which a prominent example is ammonium perchlorate. The matrix propellant can likewise be devoid of metallic ballistic modifiers, such as lead, lead compounds, or lead salts. When lead in any form is present, the use of a ballistic control propellant in the foam of relatively thin sticks allows a reduction in the lead by confining the lead to the sticks. In certain embodiments of the invention, however, no lead is included in any part of the propellant grain, including the sticks. Both the ballistic control propellant and the matrix propellant can also be devoid of RDX.

Figure 2:
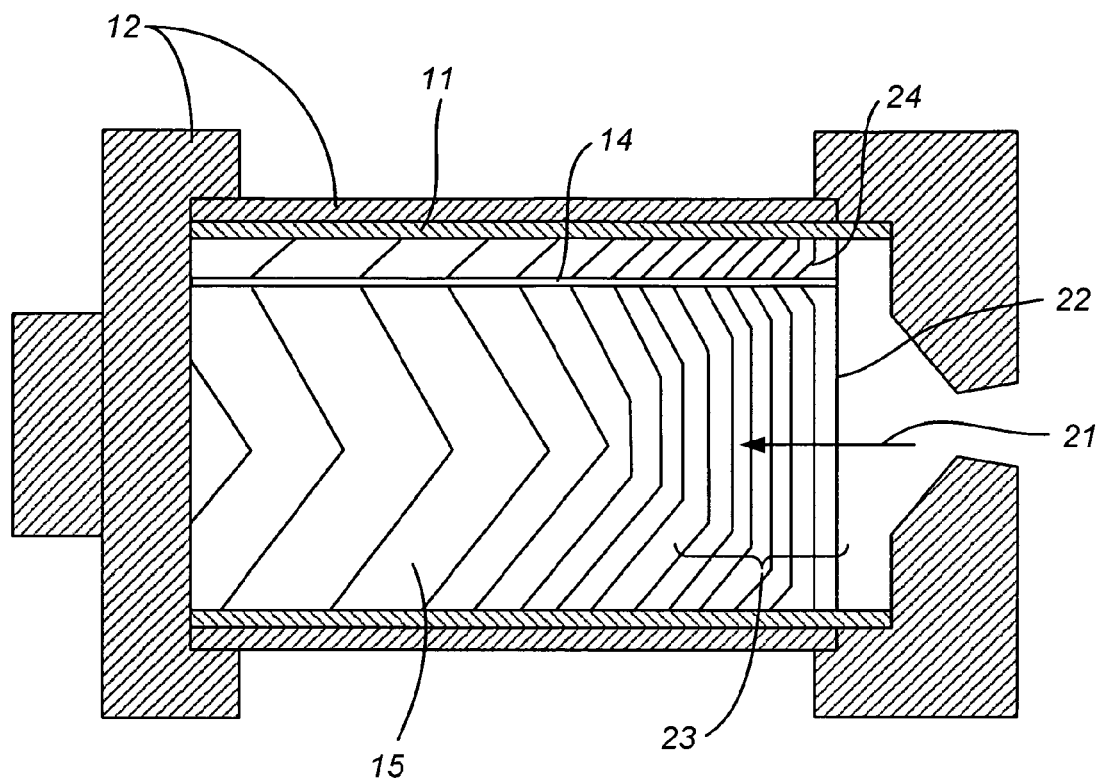
FIG. 2 is a longitudinal cross section of the grain of FIG. 1, showing the burn profile.

FIGS. 1 and 2 depict one example of a propellant grain configuration in accordance with this invention, and the burn profile of the grain.

FIG. 1 is a transverse cross section of the grain in perspective, showing the grain contained in a boot 11 which is in turn surrounded by a heavywall case 12, both of which are essentially bodies of revolution about a central longitudinal axis 13. The grain includes seven sticks 14 of ballistic control propellant, with one stick along the longitudinal axis 13 and the remaining six arranged in a circle centered around the axis 13, all sticks parallel to the axis 13 and extending the full length of the grain. The remainder of the grain is the matrix propellant 15.

FIG. 2 is a longitudinal cross section of the motor, taken along a plane parallel to the longitudinal axis but offset from the axis to intersect only one of the sticks 14, and specifically a stock that is other than the stick at the axis of the motor. The direction of burn is indicated by the arrow 21, and the initial burn surface 22, i.e., the surface at which ignition occurs, is at the aft end of the grain. The transverse lines 23 in the grain represent the burn profile at increasing times, from initiation (t=0) at the far right (where the burn surface is flat) to progressive times toward the left. As shown in the profile, a cone-shaped indentation 24 forms in the burn surface in the early stages of burning, and the diameter of the indentation increases as the burn progresses to the point where the burn surface lacks a flat portion entirely. The slanted lines of the burn profile at the opposite side of the grain are a portion of the growing cone of another stick.

The foregoing description is offered primarily for purposes of illustration. Further modifications, variations, examples, and substitutions that will be apparent to those skilled in the art are likewise included in the scope of the invention.

In the claims appended hereto or any claims subsequently added, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. An end-burning grain of a solid gas-generating composition, said grain having an ignition end and a longitudinal axis, said grain comprising:
    a matrix propellant having a matrix propellant burn rate, wherein said matrix propellant is devoid of metallic fuels and halogen-containing, additives, and
    a rod of ballistic control propellant embedded in said matrix propellant, wherein said ballistic control propellant comprises nitrocellulose an energetic plasticizer, and a high-nitrogen burning rate modifier and is devoid of ammonium perchlorate,
    wherein the ballistic control propellant and the matrix propellant are devoid of metallic ballistic modifiers,
    said ballistic control propellant having a ballistic control propellant burn rate that is substantially greater than said matrix propellant burn rate,
    said rod terminating at said ignition end of said grain, wherein the matrix propellant and the ballistic control propellants are solid propellants.

2. The end-burning grain of claim 1 wherein said rod is substantially parallel to said longitudinal axis.

3. The end-burning grain of claim 1 comprising a plurality of said rods, all substantially parallel to said longitudinal axis.

4. The end-burning grain of claim 1 wherein said ballistic control propellant burn rate is from about 1.3 times to about ten times said matrix propellant burn rate.

5. The end-burning grain of claim 1 wherein said ballistic control propellant burn rate is from about 1.5 times to about three times said matrix propellant burn rate.

6. The end-burning grain of claim 1 wherein said ballistic control propellant burn rate is about 1.9 cm/sec to about 12.7 cm/sec at 2,000 psi, and said matrix propellant burn rate is about 0.64 cm/sec to about 5.1 cm/sec at 2,000 psi.

7. The end-burning grain of claim 1 wherein said ballistic control propellant burn rate is about 2.2 cm/sec to about 7.6 cm/sec at 2,000 psi, and said matrix propellant burn rate is about 1.0 cm/sec to about 2.5 cm/sec at 2,000 psi.

8. The end-burning grain of claim 1 wherein said ballistic control propellant burn rate is about 0.64 cm/sec to about 5.1 cm/sec faster than said matrix propellant burn rate.

9. The end-burning grain of claim 1 wherein said ballistic control propellant burn rate is about 1.0 cm/sec to about 2.5 cm/sec faster than said matrix propellant burn rate.

10. The end-burning grain of claim 1 wherein said ballistic control propellant comprises nitrocellulose, an energetic plasticizer, and a high-nitrogen burning rate modifier.

11. The end-burning grain of claim 1 wherein said ballistic control propellant comprises (i) nitrocellulose, (ii) a member selected from the group consisting of cyclotetramethylene tetranitramine, butyl nitratoethyl nitramine, butanetriol trinitrate, bis-dinitropropylacetal/formal, and methyl/ethyl nitratoethyl nitramine, and (iii) a member selected from the group consisting of triaminoguanidinium azotetrazolate, guanidinium azotetrazolate, 1,1-diamino-2,2-nitroethene, 3,3'-diamino-4,4'-azoxyfurazan, and 2,6-diamino-3,5-dinitropyrazine-1-oxide, and said matrix propellant is a member selected from the group consisting of bis-nitrofurazanyl furoxan,3,3'-dinitro-4,4'-furazanyl oxamide, methylene-bis-aminonitrofurazan, 2,4,6,8,10,12-hexanitro-2,4,6,8,10,12-hexaazaisowurtzitane, and ammonium 2-oxy-5-nitrotetrazolate.

12. The end-burning grain of claim 1 wherein said matrix propellant is devoid of metallic fuels and halogen-containing additives.

13. The end-burning grain of claim 1 wherein said matrix propellant is devoid of lead, lead compounds, and lead salts.

14. The end-burning grain of claim 1 wherein said ballistic control propellant and said matrix propellant are both devoid of cyclotrimethylene trinitramine.

15. The end-burning grain of claim 1 wherein said ballistic control propellant and said matrix propellant are both devoid of cyclotrimethylene trinitramine, lead, lead compounds, and lead salts.

16. The end-burning grain of claim 1 wherein said grain has a (ballistic control propellant):(matrix propellant) cross section area ratio of from about $1 \times 10_{-4}$ to about $3 \times 10^{-3}$.

17. The end-burning grain of claim 1 wherein said grain has a (ballistic control propellant):(matrix propellant) cross section area ratio of from about $3 \times 10^{-4}$ to about $1 \times 10^{-3}$.

* * * * *